United States Patent [19]
Karte

[11] Patent Number: 5,742,161
[45] Date of Patent: Apr. 21, 1998

[54] METHOD AND DEVICE FOR DETECTING DISPLACEMENT OF VALVE ROD MOVEMENT IN AN ELECTROPNEUMATIC POSITION REGULATOR WITH AT LEAST ONE PROXIMITY SENSOR

[75] Inventor: Thomas Karte, Lemgo, Germany

[73] Assignee: Mannesmann Aktiengesellschaft, Düsseldorf, Germany

[21] Appl. No.: 584,730

[22] Filed: Jan. 11, 1996

Related U.S. Application Data

[63] Continuation of Ser. No. 156,072, Nov. 23, 1993.

[30] Foreign Application Priority Data

Nov. 23, 1992 [DE] Germany ............... 42 39 635.2

[51] Int. Cl.⁶ ..................... G01B 7/14; G01D 5/20
[52] U.S. Cl. ............... 324/207.16; 324/207.12; 324/225; 324/207.2; 324/207.26
[58] Field of Search ............ 324/207.12, 207.16, 324/207.22, 207.24, 207.26, 225, 226, 234, 236, 262, 327, 207.15; 331/65, 66, 176; 307/116; 361/179–180

[56] References Cited

U.S. PATENT DOCUMENTS

| | | | |
|---|---|---|---|
| 4,112,365 | 9/1978 | Larson et al. ............... | 324/207.16 X |
| 4,638,250 | 1/1987 | Shen-Orr et al. ............ | 324/207.17 |
| 4,950,985 | 8/1990 | Voss et al. ................ | 324/207.16 |
| 5,027,066 | 6/1991 | Reder ..................... | 324/207.16 |
| 5,043,661 | 8/1991 | Dubey .................... | 324/225 |
| 5,045,785 | 9/1991 | Hansen ................... | 324/207.24 X |
| 5,072,180 | 12/1991 | Moreau ................... | 324/236 X |
| 5,126,664 | 6/1992 | Howard ................... | 324/225 |
| 5,158,166 | 10/1992 | Barson ................... | 324/225 |
| 5,302,894 | 4/1994 | Hrubes ................... | 324/207.15 |
| 5,332,966 | 7/1994 | Berberich ................. | 324/225 |

FOREIGN PATENT DOCUMENTS

| | | | |
|---|---|---|---|
| 0351609 | 1/1990 | European Pat. Off. . | |
| 2352851 | 4/1975 | Germany ................. | 324/207.16 |
| 3303738 | 8/1984 | Germany ................. | 324/207.16 |
| 0241644 | 12/1986 | Germany ................. | 324/207.15 |
| 0904689 | 8/1962 | United Kingdom ........... | 324/207.16 |
| 8706354 | 10/1987 | WIPO . | |

OTHER PUBLICATIONS

Pub., Howard C. Roberts, University of Illinois, Instruments, vol. 17, pp. 334–339, Jun. 1944.
Balluff Induktive Nahcrungs, Inductive Sensors, pp. 0.2.0–0.2.1 (date not available).

*Primary Examiner*—Sandra L. O'Shea
*Assistant Examiner*—J. M. Patidar
*Attorney, Agent, or Firm*—Cohen, Pontani, Lieberman, Pavane

[57] ABSTRACT

A method and apparatus for detecting displacement of valve rod movement in electropneumatic position regulators, by generating a high-frequency electromagnetic alternating field by exciting a high-frequency oscillation within an LC oscillating circuit in an inductive sensor, damping the high-frequency oscillation as a function of displacement via an electrically conductive body moved along by the valve rod, demodulating the oscillator signal and feeding the demodulated signal to a microcomputer without amplification for evaluation of the displacement-dependent damping of the oscillation amplitude, measuring the temperature within the inductive sensor, correlating the temperature with the measured oscillation amplitude in the microcomputer, and determining a corrected displacement signal from the correlation.

5 Claims, 5 Drawing Sheets

METHOD AND DEVICE FOR DETECTING DISPLACEMENT OF VALVE ROD MOVEMENT IN AN ELECTROPNEUMATIC POSITION REGULATOR WITH AT LEAST ONE PROXIMITY SENSOR

This is a continuation, of application Ser. No. 08/156,072, filed Nov. 23, 1993.

BACKGROUND OF THE INVENTION

1. Field of the Invention

The invention is directed to a method for measuring the displacement of valve rod actuation for electropneumatic position regulators and to a plurality of devices for implementing this method.

2. Description of the Prior Art

Displacement measuring systems for detecting the valve rod movement in electropneumatic position regulators are known in general. Most often used are potentiometers which can be actuated via a corresponding lever tap coupled with the valve rod. Further, capacitive sensors and differential transformers for detecting the valve rod movement are known with the use of lever sensing at the valve rod. Moreover, inductive proximity sensors are also known from the prior art, but these serve purely as position switches. Thus, end positions can be detected, but displacement is not measured or recorded along the entire course of the valve rod movement.

The disadvantages of these known systems are many. Potentiometers are generally susceptible to wear, particularly when they are used in the region of heavy mechanical vibrations. This wear manifests itself in an increasing abrasion at the operating point of the potentiometer. The use of rotating capacitors is very expensive, since expensive measures must be taken to protect against moisture and very precise mechanical bearings are also necessary. The use of differential transformers is disadvantageous due to the expensive mechanical bearing for suppressing transverse movements of the magnet in the coil. The electronics required for supplying power are also too expensive and consume a relatively large amount of energy.

SUMMARY OF THE INVENTION

Therefore, the object of the present invention is to provide a method for measuring the displacement of the valve rod movement in electropneumatic position regulators by which the displacement can be detected in a simple and reliable manner, and to provide a plurality of devices which enable accurate detection and measurement of displacement in a simple construction.

Pursuant to these objects,and others which will become apparent hereafter, one aspect of the present invention resides in a method for detecting the displacement of valve rod movement in electropneumatic position regulators, in which method a high-frequency electromagnetic alternating field is generated by exciting a high-frequency oscillation with an LC oscillating circuit in an inductive sensor. The high-frequency oscillation is then damped as a function of displacement via an electrically conductive body moved along by the valve rod. Next, the oscillator signal is demodulated and fed to a microcomputer without amplification for evaluating the displacement-dependent damping of the oscillation amplitude.

In another embodiment of the invention the inductive sensor is used in pulse-interval operation.

In yet another embodiment of the inventive method, the temperature is measured within the inductive sensor and correlated with the measured oscillation amplitude. A correlated displacement signal is then determined from this correlation.

Another aspect of the invention resides in a device for detecting the displacement of the valve rod movement in electropneumatic position regulators. This device includes a displacement sensor and a transmitter securely coupled with the valve rod. The transmitter is produced from electrically conductive material while the displacement sensor has an inductive, stray field. The displacement sensor is arranged in a region of the inductive stray field toward the transmitter and aligned parallel to the movement direction of the valve rod.

In another embodiment of the invention the transmitter has a conical recess with a base that is open toward the displacement sensor over its entire cross-section.

Still another aspect of the presently claimed invention resides in a device for detecting valve rod movement in electropneumatic position regulators, in which the device includes at least one inductive displacement sensor that works according to the principle of induction without making contact. The inductive displacement sensor is arranged with respect to its detection direction so as to be aligned vertically to a lift direction of the valve rod. At least one electrically conductive wedge is provided on the valve rod so as to be in an inductively active range of influence of the displacement sensor. The electrically conductive wedge forms an oblique plane with reference to the movement direction of the valve rod and corresponds in length, at a maximum, to the amount of valve rod lift.

In still another embodiment of the invention two displacement sensors and two electrically conductive wedges are provided which are arranged opposite one another on different longitudinal sides of the valve rod.

The use of inductive processes for position detection is known per se, but the present invention makes use of an inductive "displacement detection". The operation of conventional inductive measurement processes ultimately requires an output amplification of the signal at the output or prior to the output of the transmitter. The present method deliberately dispenses with this output amplification. For this purpose, a high-frequency oscillation is excited and the amplitude of this high-frequency oscillation can be influenced by metallic or electrically conductive objects. With the use of a ferrite core and a coil as an LC oscillating circuit, the high-frequency oscillation,generates a high-frequency electromagnetic alternating field. When metallic or electrically conductive objects penetrate or move in this field, eddy current losses occur which dampen the corresponding oscillation. The oscillation amplitude of this oscillation accordingly represents a measurement for the proximity of the sensor to an electrically conductive or metallic object. The correspondingly demodulated oscillator signal is essentially fed directly to the microcomputer without further output amplification. The temperature in the region of the sensor is measured simultaneously in order to compensate for the temperature dependence of this utilized effect.

The measured oscillator signal amplitudes and the temperature are then correlated in a microcomputer and the distance of the sensor which can ultimately be related to this is detected by a metallic driver which accompanies the movement of the valve rod. Since microcomputers are generally employed when using electropneumatic position regulators in process control systems, the necessary microcomputer is available. Other influences as well as corresponding pre-adjusted movement values can then also be taken into account in this microcomputer, as is provided for in a further advantageous embodiment. The direct, i.e. unamplified, input of the demodulated oscillator signal into the microcomputer proves particularly advantageous as this makes possible a direct input into a regulating means and accordingly enables processing e.g. in accordance with fuzzy logic. The detected displacement signal is already safely in an electrical form which is acceptable on a computer level so that it is extremely simple to adapt to software-supported regulating processes. Moreover, it is possible in this way to manage nonlinearity in the characteristic line by making individual corrections, e.g. by accessing tables in the microcomputer. The influence of the mechanical components cooperating in the measurement are accordingly also detected and compensated for.

As a whole, the method according to the invention indicated above has the operational advantage that mechanical couplings with the sensor can be entirely dispensed with. In particular, the sensor may be fully encapsulated without translatory or rotatory arrangements, resulting in a system which is particularly resistant to dirt and environmental influences.

Various alternative constructions of the devices according to the invention are also possible. A first alternative consists in aligning the sensor parallel to the valve rod and arranging a correspondingly electrically conductive metallic element vertically thereto so as to be rigidly connected with the valve rod and so as to participate in its movement. The oscillation amplitude accordingly varies as a function of the distance between the metallic element participating in the movement and the stationary displacement sensor.

In another construction, the displacement sensor is aligned vertically relative to the movement direction of the valve rod and the valve rod is connected with a metallic wedge. The length of the wedge in the movement direction of the valve rod corresponds to the lift of the valve rod. Accordingly, the metallic wedge presents an oblique plane along the valve rod. The inductive sensor which is aligned vertically to the valve rod is also arranged so as to be stationary in this instance. As a result, the displacement sensor records the metallic material of the wedge at different distances depending on the region of the "oblique plane" which has just passed by the sensor. For example, the very bottom of the oblique plane presents itself in one end position of the valve rod so that the distance of the displacement sensor from the metallic material of the wedge is quite large. The other end position of the valve rod is located in the region of the highest point of the oblique plane, which means that the metallic material of the wedge is very close to the displacement sensor. By appropriate selection of the inclination of this "oblique plane", a deliberate downward setting or upward setting of the displacement may be adjusted for detecting displacement. This arrangement makes up for the fact that the range of detection of the inductive sensor for objects approaching it is generally quite small, usually Smaller than the valve rod lift to be detected.

In another construction, two wedges are arranged at opposite sides of the valve rod in the movement direction and two displacement sensors are also arranged opposite one another in a corresponding manner. This arrangement mirrors the previous arrangement along the axis of the valve rod. However, this type of arrangement has the considerable advantage that the play of the valve rod can also be taken into account and compensated for in addition to the displacement detection of the valve rod movement. In this case, play, i.e. a deflection vertical to the movement direction of the valve rod in one direction, would mean that the amplitude increases at one displacement sensor and is lowered simultaneously and to the same extent at the other displacement sensor. The essential point is that the actual displacement signal of one or the other displacement sensor is not taken into account by itself, but rather the signals of both displacement sensors are added together. The summed signal is accordingly constant with respect to lateral movement of the valve rod, i.e. it is corrected for error and variable only as a function of the lift of the valve rod. This means that errors are corrected automatically without additional action. This last possibility is based on the first construction principle mentioned above. In this instance also, a metallic element is arranged at the valve rod and moved together with the valve rod. As in the previous embodiment, the displacement sensor is also aligned parallel to the valve rod in the movement direction of the valve rod. The displacement sensor is likewise arranged so as to be stationary. The special feature of this embodiment is that the metallic element moved along by the valve rod has a recess with a characteristic contour. This recess is conical and is worked into the metallic body in such a way that the base of the cone is open over its full cross section and faces the displacement sensor. This embodiment combines the functions of all of the embodiments described above. The stray field of the displacement sensor forms a "lobe" which extends into this conical recess. When the valve rod is moved, this stray field region runs along the outer surface of the cone as in the case of an oblique plane. Accordingly, as a result of the upward setting and downward setting effect, this embodiment can be used when the valve rod lift is greater than or less than the actual recording range of the displacement sensor. A sectional view through this metallic body vertical to the axis of the cone would present two oblique planes joined at the tip of the cone. In this instance, the signal is again compensated for automatically as described above when there is lateral displacement in addition to the lift direction of the valve rod. This means that the stray lobe is closer to one oblique plane and at a greater distance from the other oblique plane so that the summed signal of this sensor is "self-compensated" with respect to the lateral displacement of the valve rod.

In a final embodiment, the valve rod actuates a cam disk via an articulated lever. Although this entails mechanical components, the displacement sensor ultimately senses the movement in a contactless manner. The reduction in wear achieved in the present invention is also effected in this instance. In this construction, extremely large valve rod lifts can be measured by an inductive displacement sensor under certain circumstances, although the latter can detect only within a short range. The distance of the cam disk from the displacement sensor increases or decreases depending on position and this cam disk is also produced from the metallic or electrically conductive material in order to realize the inductive principle of the measuring arrangement.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
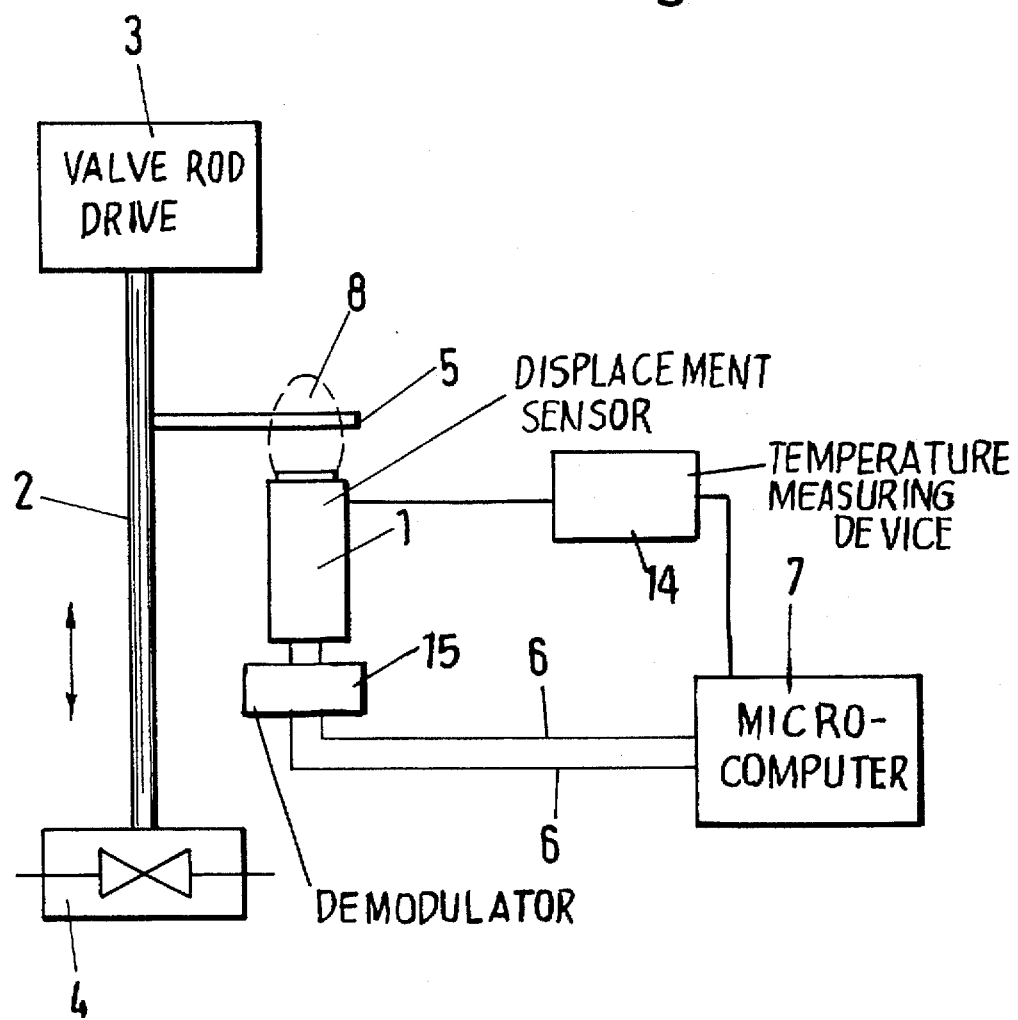
FIG. 1 shows a valve rod with parallel alignment of the displacement sensor.

FIG. 1 shows the first embodiment in which the displacement sensor 1 is aligned parallel to the valve rod 2. The stray field 8 is shown at the displacement sensor 1. A metallic or electrically conductive body 5 is fastened to the valve rod 2 and is moved along with it. Accordingly, the metallic or electrically conductive body is moved into the stray field 8 and causes a damping of the oscillation produced in the displacement sensor 1. The delimiting of the stray field 8 shows that the range of the stray field is finite as determined by a sufficiently large signal. Accordingly, the extent of the stray field is the operating range of the displacement sensor. Thus, the extent of the stray field and the operating range must be at least equal to the lift of the valve rod to be detected.

A conventional temperature measuring device can also be provided to determine the temperature of the sensor 1.

The drive 3 of the valve rod 2 can be electromagnetic, mechanical or pneumatic, for example. The specific valve 4 is then actuated via the valve rod 2.

It can also be seen that the displacement detection device is designed according to the two-wire technique, i.e. two electric lines 6 lead from the output of the displacement sensor 1 to the microcomputer 7.

As is known, the signal coming from the sensor 1 is passed through a demodulator 15 before reaching the microcomputer 7.

Figure 2:
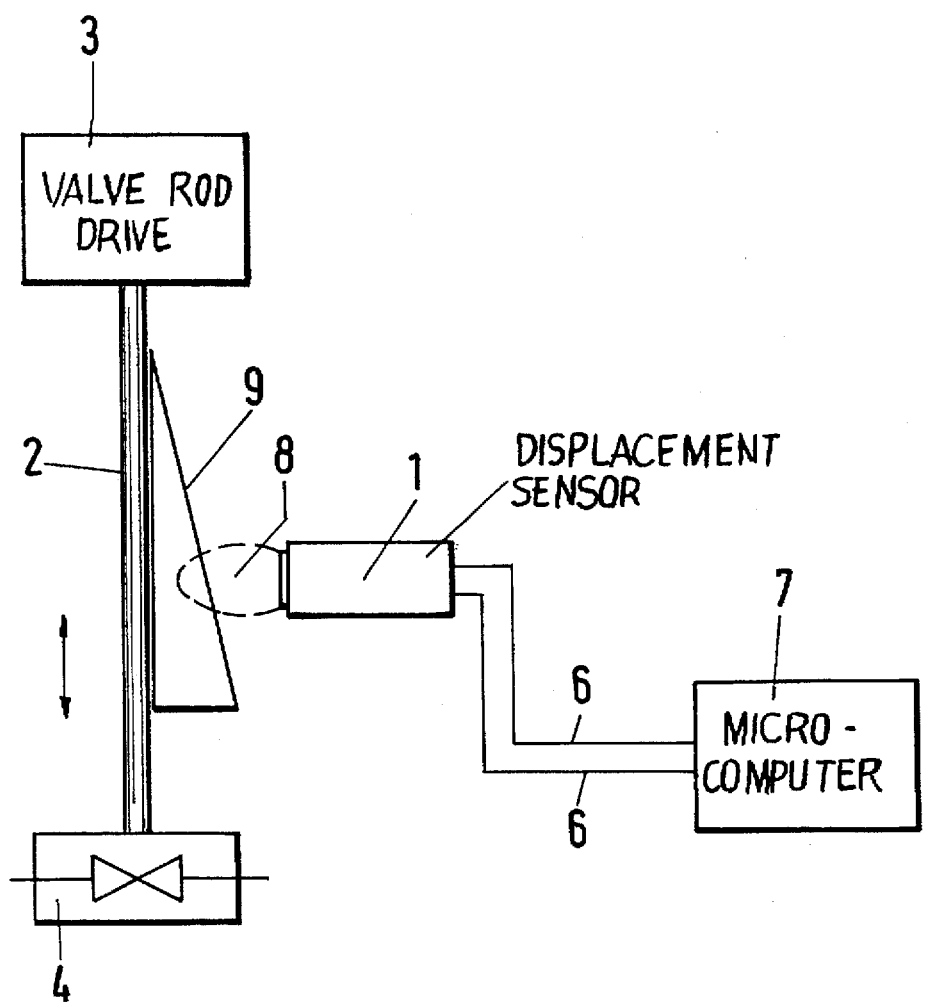
FIG. 2 shows a valve rod with a metallic wedge and vertically aligned displacement sensor.

FIG. 2 shows a valve rod 2 with a metallic wedge 9 and a displacement sensor 1 aligned vertically thereto. The metallic wedge 9 is contoured and fastened at the valve rod 2 in such a way that an oblique plane is formed in the movement direction of the valve rod 2 in this side view. The stray field 8 of the displacement sensor 1 is again marked in this figure. The essential point here is that this oblique plane effects a kind of displacement conversion. That is, the distance of the oblique plane of this wedge from the displacement sensor 1 decreases or increases depending on the position of the valve rod. The oblique plane can be dimensioned in such a way with respect to its inclination that a very large valve rod lift is transformed into a very small change in distance along the oblique plane relative to the displacement sensor. This means that the influence on the stray field and accordingly on the damping of the oscillation increases or decreases depending on the location of the oblique plane with reference to the stationary stray field 8 of the displacement sensor 1. Since, as was already mentioned, the stray field of the inductive displacement sensor generally has only a short range, even large valve rod lifts can be detected in terms of displacement by means of such a displacement conversion.

Figure 3:
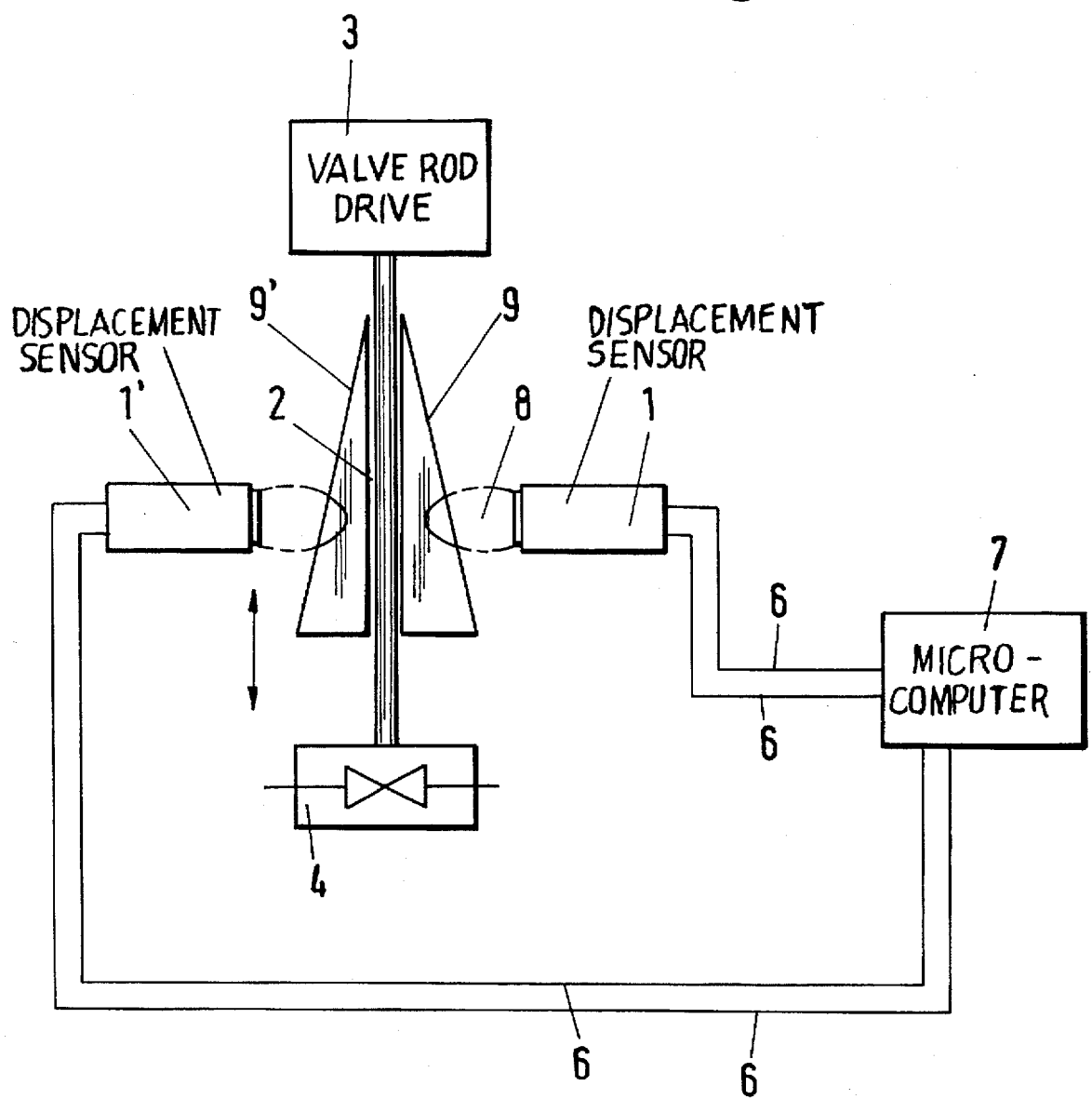
FIG. 3 shows a valve rod with two metallic wedges and two vertically aligned displacement sensors.

FIG. 3 shows an arrangement which mirrors that of FIG. 2 at an imaginary plane of reflection parallel to the valve rod 2 in which two displacement sensors 1, 1' are arranged opposite one another and two wedges 9, 9' are arranged at opposite sides of the valve rod 2.

Figure 4:
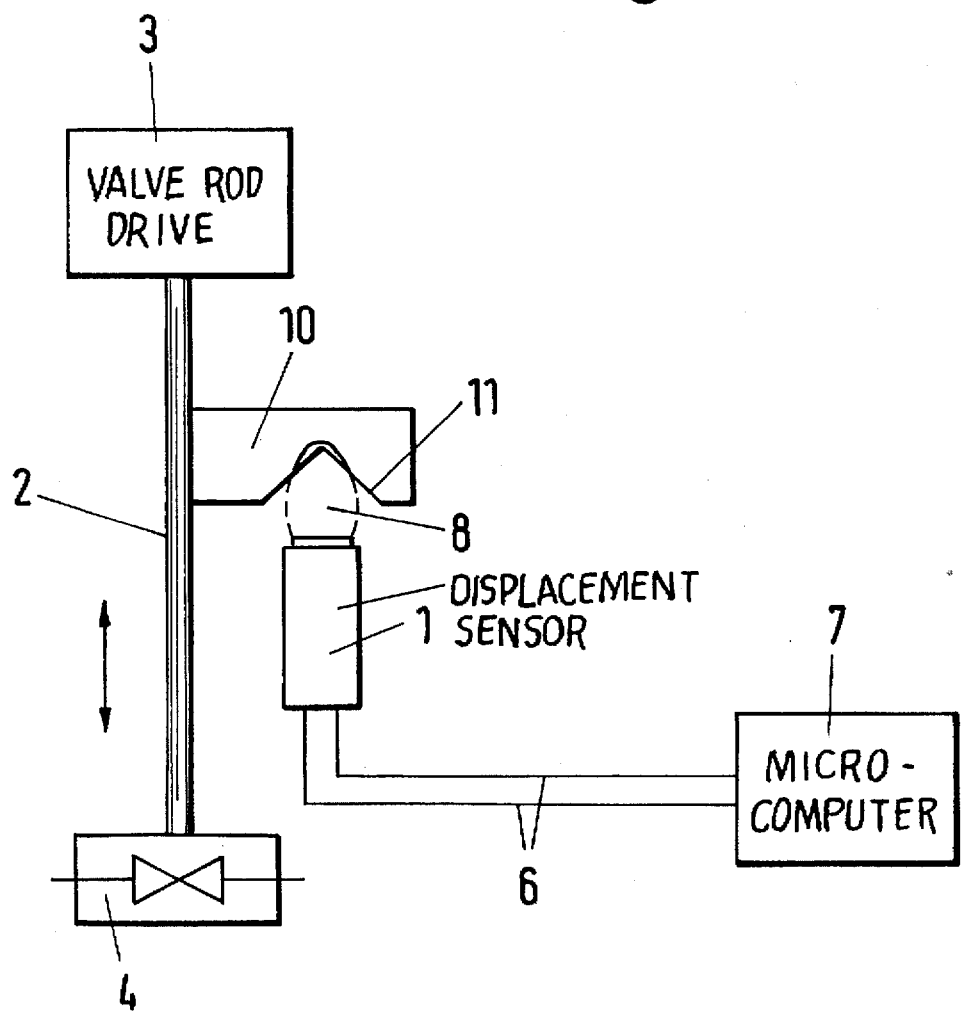
FIG. 4 shows a valve rod with a metallic body having a conical recess and parallel alignment of the displacement sensor.

FIG. 4 shows a valve rod 2 with a metallic body 10 having a conical recess and a displacement sensor 1 which is aligned parallel to the valve rod 2. The metallic or electrically conducting body 10 is shown in section. In reality, this wedge-shaped notch 11 is symmetrical with respect to rotation, that is, conical. In addition, the displacement sensor 1 is arranged parallel to the valve rod 2 and with its central axis toward the tip of the cone. This arrangement functions in approximately the same way as the arrangement according to FIG. 3. The arrangement according to FIG. 3 has the advantage that, in addition to the detection of displacement in the movement direction of the valve rod, the disturbance variable of the lateral displacement of the valve rod due to play in the valve can also be compensated for in that the displacement sensor signals of the sensors 1 and 1' are combined as a summed signal and a lateral displacement is accordingly compensated for in the sum of the two signals. This is achieved in FIG. 4 by a sensor 1. If a lateral displacement of the valve rod occurs due to play in the valve, the range of influence of one oblique plane, which is shown in section in this figure, is greater than that of the other oblique plane, so that the cumulative signal remains unchanged in the event of lateral displacement of the valve rod.

Figure 5:
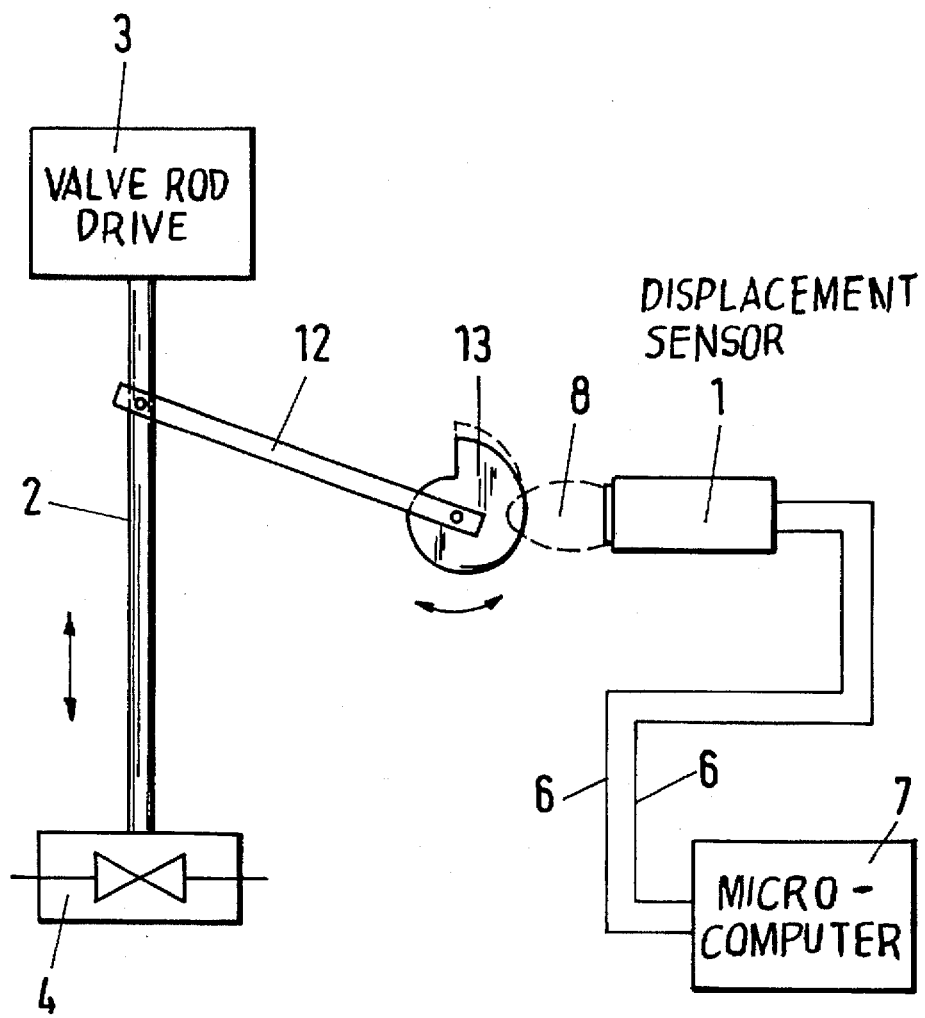
FIG. 5 shows a valve rod with cam disk and displacement sensor.

FIG. 5 shows a final embodiment in which the lift of the valve rod 2 actuates, i.e. rotates, an eccentrically supported cam disk 13 via an articulated lever 12. The displacement sensor 1 is again arranged so as to be stationary. The cam disk 13 is contoured and articulated in such a way that the distance of the outer contour of the cam disk 13 from the displacement sensor 1 changes when rotated. This results in a damping of the oscillation in the displacement sensor as a function of the angle of rotation. The angle of rotation in turn depends on the valve rod movement. This device can be realized with optimal precision by means of corresponding dimensioning of the cam disk and lever arrangement.

All of the figures in the drawing show substantially only the actual displacement detection device and the valve rod drive 3 and valve 4 itself are shown schematically in all of the figures, the displacement detection device being arranged in the space between these two elements.

I claim:

1. A method for detecting displacement of valve rod movement in electropneumatic position regulators, comprising the steps of: generating a high-frequency electromagnetic alternating field by exciting a high-frequency oscillation within an LC oscillating circuit in an inductive sensor arranged perpendicular to a direction of the valve rod movement; damping the high-frequency oscillation as a function of displacement of the valve rod via an electrically conductive body connected to and moved by the valve rod so that the surface of the conductive body moves toward and away from the sensor as a function of valve rod movement; demodulating the oscillator signal and feeding the demodulated signal to a microcomputer without amplification for evaluation of the displacement-dependent damping of the oscillation amplitude; measuring the temperature within the inductive sensor; correlating the temperature with the measured oscillation amplitude in the microcomputer; and determining a corrected displacement signal from the correlation in the microcomputer.

2. A method according to claim 1, including using the inductive sensor in pulse-interval operation.

3. A device for detecting valve rod movement in electropneumatic position regulators, the valve rod being movable in a movement direction, comprising: at least one stationary inductive displacement sensor that works according to a principle of induction without making contact and has an inductively active range of influence, the inductive displacement sensor being arranged perpendicular to the movement direction of the valve rod; and at least one electrically conductive wedge provided on the valve rod so as to be in the inductively active range of influence of the displacement sensor, the electrically conductive wedge having a surface that forms an oblique plane relative to the movement direction of the valve rod and having a length equal to a maximum amount of valve rod movement, whereby movement of the wedge with the valve rod causes a distance between the oblique plane and the displacement sensor to change as a function of valve rod movement, the sensor is operative to sense the change in distance.

4. A device according to claim 3, wherein two displacement sensors and two electrically conductive wedges are provided which are arranged opposite one another on different longitudinal sides of the valve rod.

5. A device for detecting valve rod movement in an electropneumatic position regulator, comprising:

a stationary displacement sensor;

a cam disk; and a lever provided to connect the cam disk to the valve rod so that movement of the valve rod causes eccentric rotation of the cam disk, the cam disk having an outer contour which is configured so that a distance of the outer contour of the cam disk from the displacement sensor changes with movement of the valve rod and rotation of the cam disk, the cam disk being arranged so as to be in an inductively active range of influence of the displacement sensor so that the displacement sensor senses the change in distance between the cam disk and the sensor as the valve rod moves.

* * * * *